(12) United States Patent
Willi et al.

(10) Patent No.: US 8,150,603 B2
(45) Date of Patent: Apr. 3, 2012

(54) ENGINE CONTROL SYSTEM HAVING FUEL-BASED TIMING

(75) Inventors: Martin L. Willi, Dunlap, IL (US); Scott B. Fiveland, Metamora, IL (US); David T. Montgomery, Edelstein, IL (US); Weidong Gong, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 634 days.

(21) Appl. No.: 12/292,836

(22) Filed: Nov. 26, 2008

(65) Prior Publication Data
US 2010/0131172 A1    May 27, 2010

(51) Int. Cl.
*F02D 41/14*    (2006.01)
(52) U.S. Cl. .................. 701/111; 123/435; 123/90.15
(58) Field of Classification Search .......... 701/103–105, 701/111; 123/90.15, 568.14, 435
See application file for complete search history.

(56) References Cited

U.S. PATENT DOCUMENTS

| | | | |
|---|---|---|---|
| 5,027,769 A | 7/1991 | Yoshida et al. | |
| 5,168,954 A | 12/1992 | Nakaniwa et al. | |
| 5,325,829 A | 7/1994 | Iwasiuk | |
| 5,765,532 A | 6/1998 | Loye | |
| 5,806,490 A | 9/1998 | Nogi et al. | |
| 5,878,717 A | 3/1999 | Zur Loye | |
| 5,918,577 A * | 7/1999 | Martelli et al. | 123/295 |
| 6,000,384 A | 12/1999 | Brown et al. | |
| 6,276,334 B1 | 8/2001 | Flynn et al. | |
| 6,286,482 B1 | 9/2001 | Flynn et al. | |
| 6,354,268 B1 | 3/2002 | Beck et al. | |
| 6,371,092 B1 | 4/2002 | Guglielmo et al. | |
| 6,397,814 B1 | 6/2002 | Nagaishi et al. | |
| 6,651,618 B1 | 11/2003 | Coleman et al. | |
| 6,732,685 B2 | 5/2004 | Leman | |
| 6,799,552 B2 | 10/2004 | Crowell et al. | |
| 6,840,235 B2 * | 1/2005 | Koseki et al. | 123/568.14 |
| 6,843,231 B1 | 1/2005 | Duffy et al. | |
| 6,882,929 B2 | 4/2005 | Liang et al. | |
| 6,935,287 B2 | 8/2005 | Shinogle | |
| 6,941,909 B2 | 9/2005 | Robel et al. | |
| 6,976,459 B2 | 12/2005 | Kagy et al. | |

(Continued)

FOREIGN PATENT DOCUMENTS
EP        0 945 606 A2    9/1999
(Continued)

OTHER PUBLICATIONS

"Throttleless engines—BMW Valvetronic" posted at http://www.autozine.org/technical_school/petrol2.htm (available Feb. 15, 2005).

(Continued)

*Primary Examiner* — Hai Huynh
(74) *Attorney, Agent, or Firm* — Finnegan, Henderson, Farabow, Garrett & Dunner LLP (57) ABSTRACT

A control system for an engine having a cylinder is disclosed having an engine valve movable to regulate a fluid flow of the cylinder and an actuator associated with the engine valve. The control system also has a sensor configured to generate a signal indicative of an amount of an air/fuel mixture remaining within the cylinder after completion of a first combustion event and a controller in communication with the actuator and the sensor. The controller may be configured to compare the amount with a desired amount, and to selectively regulate the actuator to adjust a timing of the engine valve associated with a subsequent combustion event based on the comparison.

20 Claims, 3 Drawing Sheets

U.S. PATENT DOCUMENTS

| | | |
|---|---|---|
| 6,986,330 B2 | 1/2006 | Fuwa et al. |
| 7,000,596 B2 | 2/2006 | Zurloye et al. |
| 7,055,492 B2 | 6/2006 | Yamaoka et al. |
| 7,066,142 B2 | 6/2006 | Hanasato |
| 7,073,485 B2 | 7/2006 | Truscott et al. |
| 7,080,615 B2 | 7/2006 | Shinogle |
| 7,131,416 B2 | 11/2006 | Sasaki et al. |
| 7,152,559 B2 | 12/2006 | Kuo et al. |
| 7,156,070 B2 | 1/2007 | Strom et al. |
| 7,178,491 B2 | 2/2007 | Chang |
| 7,201,121 B2 | 4/2007 | Weber et al. |
| 7,210,457 B2 | 5/2007 | Kuzuyama |
| 7,213,553 B2 | 5/2007 | Kalish et al. |
| 7,228,828 B2 | 6/2007 | Kagy et al. |
| 7,295,912 B2 | 11/2007 | Yasui et al. |
| 7,325,529 B2 | 2/2008 | Ancimer et al. |
| 7,331,317 B2 | 2/2008 | Yasui et al. |
| 7,347,171 B2 | 3/2008 | Leman et al. |
| 7,367,318 B2 | 5/2008 | Moriya et al. |
| 7,400,966 B2 | 7/2008 | Strom et al. |
| 7,509,932 B2 * | 3/2009 | Hara et al. ............... 123/90.15 |
| 7,552,588 B2 * | 6/2009 | Magner et al. ............... 60/602 |
| 7,673,616 B2 * | 3/2010 | Kolmanovsky et al. . 123/406.37 |
| 7,905,206 B2 * | 3/2011 | Willi et al. ............... 123/90.15 |
| 2002/0195086 A1 | 12/2002 | Beck et al. |
| 2005/0039723 A1 | 2/2005 | Miura |
| 2005/0241597 A1 | 11/2005 | Weber et al. |
| 2005/0241613 A1 | 11/2005 | Weber et al. |
| 2005/0247286 A1 | 11/2005 | Weber et al. |
| 2007/0062193 A1 | 3/2007 | Weber et al. |
| 2007/0089697 A1 | 4/2007 | Hara et al. |
| 2008/0035111 A1 | 2/2008 | Schmid et al. |
| 2010/0126463 A1 | 5/2010 | Willi et al. |
| 2010/0126465 A1 | 5/2010 | Willi et al. |

FOREIGN PATENT DOCUMENTS

| | | |
|---|---|---|
| EP | 1 772 608 A1 | 4/2007 |
| JP | 03011126 A | 1/1991 |
| JP | 03151518 A | 6/1991 |
| JP | 06108884 A | 4/1994 |
| JP | 07229409 | 8/1995 |
| JP | 09250379 A | 9/1997 |
| JP | 11166447 | 6/1999 |
| JP | 2001012266 | 1/2001 |
| JP | 2002285913 A | 10/2002 |
| JP | 2006017051 | 1/2006 |
| JP | 2006152943 | 6/2006 |
| JP | 2006188952 A | 7/2006 |
| JP | 2007009854 | 1/2007 |
| KR | 100812888 | 3/2008 |

OTHER PUBLICATIONS

"2008 Volkswagen Touareg BlueTDI" posted at http://www.supercarnews.net/2008-volkswagen-tuareg-blue-tdi (available Jul. 4, 2007).

* cited by examiner

FIG. 3

ENGINE CONTROL SYSTEM HAVING FUEL-BASED TIMING

STATEMENT OF GOVERNMENT INTEREST

This invention was made with Government support under Contract No. DE-FC02-01CH11079, awarded by the Department of Energy. The Government may have certain rights in this invention.

TECHNICAL FIELD

The present disclosure is directed to an engine control system and, more particularly, to an engine control system having fuel-based timing.

BACKGROUND

Combustion engines are often used for power generation applications. These engines can be gaseous-fuel driven and implement lean burn, during which air/fuel ratios are higher than in conventional engines. For example, these gas engines can admit about 75% more air than is theoretically needed for stoichiometric combustion. Lean-burn engines increase fuel efficiency because they utilize homogeneous mixing to burn less fuel than a conventional engine and produce the same power output.

Though using lean burn may increase efficiency, gaseous fuel-powered engines may be limited by variations in combustion pressures between cylinders of the engine. Gaseous fuel-powered engines are typically pre-mix charge engines, where fuel and air are mixed within an intake manifold and then admitted to a combustion chamber of the engine. Variations in combustion pressure result from more air/fuel mixture being admitted into some cylinders than into other cylinders. This uneven distribution of the air/fuel mixture can result in pockets of the air/fuel mixture burning outside of the envelope of normal combustion, increasing the tendency for an engine to knock. The combustion pressure variations can result in cylinder pressures that are significantly higher than average peak cylinder pressures normally seen within the engine. And, because significantly higher cylinder pressures can cause the engine to operate improperly, a margin of error is required to accommodate the pressure variations. As a result, the engine may be required to operate at a level far enough below its load limit to compensate for the pressure variation between the cylinders, thereby lowering the load rating of the engine. Additionally, the pressure variations can cause fluctuation in engine torque and speed, which may be undesirable for some electrical power generation applications.

An exemplary natural gas engine system is described in U.S. Pat. No. 7,210,457 B2 (the '457 patent), issued to Kuzuyama on May 1, 2007. The '457 patent discloses an engine having a plurality of cylinders that are associated with a variable valve timing device. The '457 patent also discloses a control apparatus and a sensor that detects information related to the combustion state within the cylinders. Based on information provided by the sensor, the control apparatus identifies the one cylinder having the most violent combustion. The control apparatus then controls the variable valve timing device to adjust a valve timing of all of the cylinders based on the identification. The control apparatus also adjusts a fuel injection amount to all of the cylinders based on the identification. The control apparatus thereby suppresses the combustion of all of the cylinders such that the combustion state of the most violent cylinder becomes an appropriate combustion state.

Although the engine system of the '457 patent may limit excessive pressures in any one cylinder by suppressing combustion in all of the cylinders, it may fail to limit cycle-to-cycle pressure variations in a given cylinder. The pressure in a given cylinder may vary significantly from cycle-to-cycle. This variation over time may result in fluctuations in engine torque and speed that can negatively affect electrical power generation. Further, the output of each cylinder of the '457 patent may have to be reduced to avoid possible damage to engine components because of excessive pressures that may result from pressure variation between combustion cycles within only one of the cylinders. Additionally, pressure variation between combustion cycles may lead to significant detonation in the engine system of the '457 patent.

The present disclosure is directed to overcoming one or more of the shortcomings set forth above and/or other deficiencies in existing technology.

SUMMARY OF THE DISCLOSURE

In accordance with one aspect, the present disclosure is directed toward a control system for an engine having a cylinder. The control system includes an engine valve movable to regulate a fluid flow of the cylinder, and an actuator associated with the engine valve. The control system also includes a sensor configured to generate a signal indicative of an amount of an air/fuel mixture remaining within the cylinder after completion of a first combustion event, and a controller in communication with the actuator and the sensor. The controller is configured to compare the amount with a desired amount, and to selectively regulate the actuator to adjust a timing of the engine valve associated with a subsequent combustion event based on the comparison.

According to another aspect, the present disclosure is directed toward a method of operating an engine. The method includes sensing a parameter indicative of an amount of an air/fuel mixture remaining within a cylinder of the engine after completion of a first combustion event, and comparing the amount with a desired amount. The method also includes selectively adjusting a valve timing of the engine associated with a subsequent combustion event based on the comparison.

DETAILED DESCRIPTION

Figure 1:
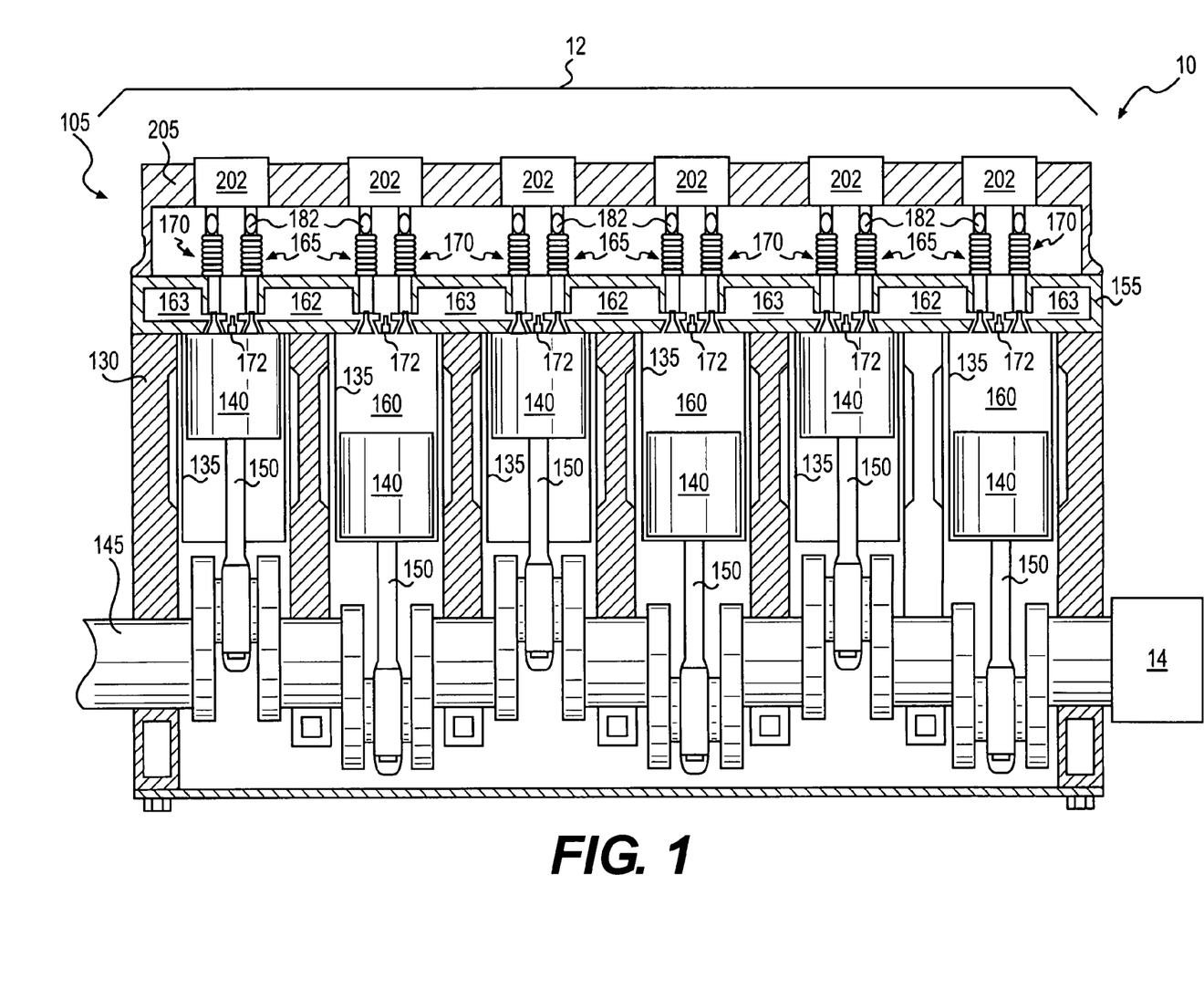
FIG. 1 is a pictorial illustration of an exemplary disclosed generator set.

FIG. 1 illustrates a generator set (genset) 10 having a prime mover 12 coupled to mechanically rotate a generator 14 that provides electrical power to an external load (not shown). Generator 14 may be, for example, an AC induction generator, a permanent-magnet generator, an AC synchronous generator, or a switched-reluctance generator. In one embodiment, generator 14 may include multiple pairings of poles (not shown), each pairing having three phases arranged on a circumference of a stator (not shown) to produce an alternating current with a frequency of about 50 and/or 60 Hz. Electrical power produced by generator 14 may be directed for offboard purposes to the external load.

Figure 2:
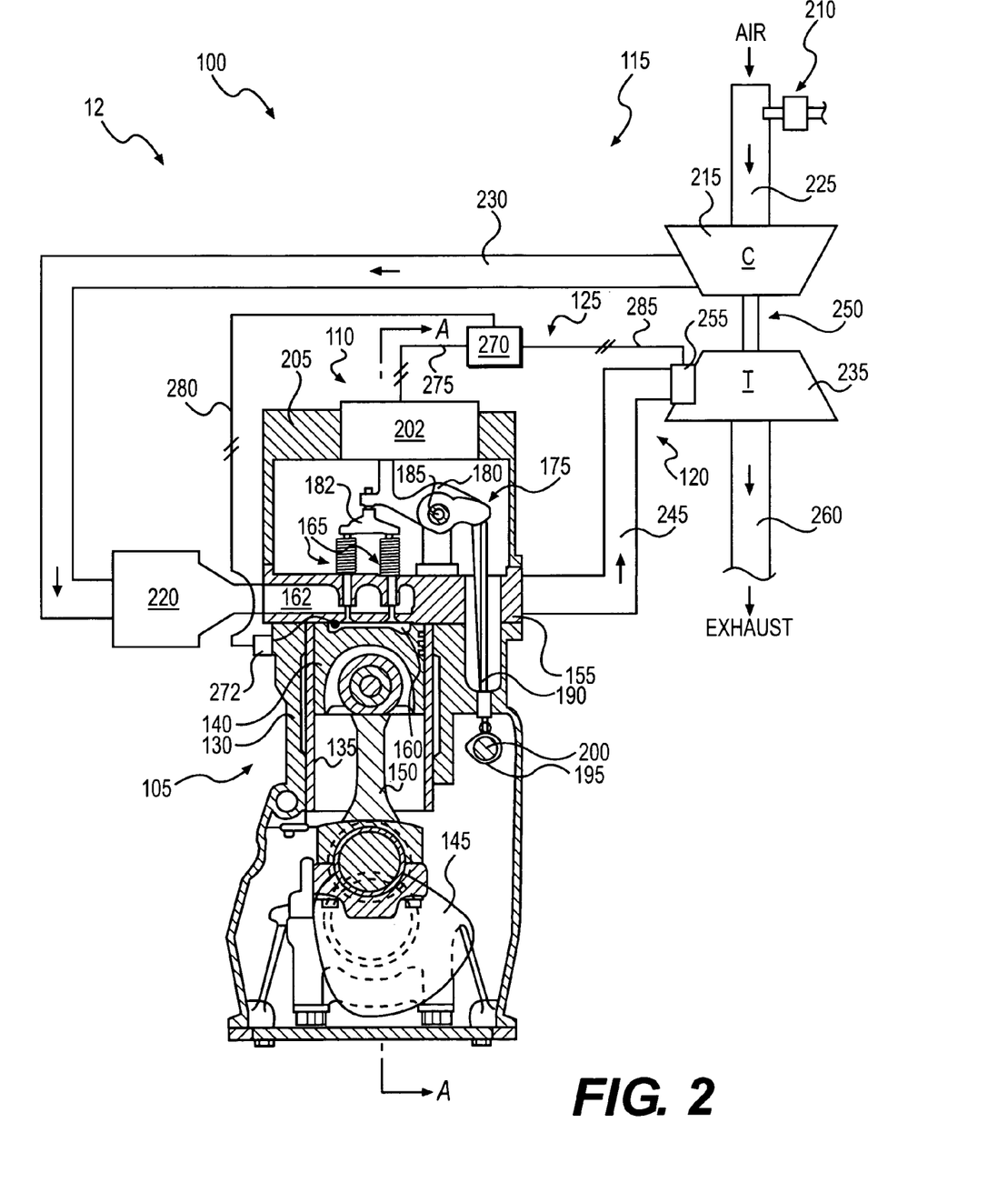
FIG. 2 is a schematic illustration of an exemplary disclosed engine system associated with the generator set of FIG. 1.

Prime mover 12 may include an engine system 100, as illustrated in FIG. 2. Engine system 100 may include an engine 105, a variable valve actuation system 110, an intake system 115, an exhaust system 120, and a control system 125. Intake system 115 may deliver air and/or fuel to engine 105, while exhaust system 120 may direct combustion gases from engine 105 to the atmosphere. Variable valve actuation system 110 may vary a valve timing of engine 105 to affect fluid flow of engine 105. Control system 125 may control an operation of variable valve actuation system 110, intake system 115, and/or exhaust system 120.

Engine 105 may be a four-stroke diesel, gasoline, or gaseous fuel-powered engine. As such, engine 105 may include an engine block 130 at least partially defining a plurality of cylinders 135 (only one shown in FIG. 2). In the illustrated embodiment of FIG. 1, engine 105 is shown to include six cylinders 135. However, it is contemplated that engine 105 may include a greater or lesser number of cylinders 135 and that cylinders 135 may be disposed in an "in-line" configuration, a "V" configuration, or in any other suitable configuration.

A piston 140 may be slidably disposed within each cylinder 135, so as to reciprocate between a top-dead-center (TDC) position and a bottom-dead-center (BDC) position during an intake stroke, a compression stroke, a combustion or power stroke, and an exhaust stroke. Returning to FIG. 2, pistons 140 may be operatively connected to a crankshaft 145 via a plurality of connecting rods 150. Crankshaft 145 may be rotatably disposed within engine block 130, and connecting rods 150 may connect each piston 140 to crankshaft 145 so that a reciprocating motion of each piston 140 results in a rotation of crankshaft 145. Similarly, a rotation of crankshaft 145 may result in a sliding motion of each piston 140 between the TDC and BDC positions. As shown in the lower portion of the graph of FIG. 3, piston 140 may move through the intake stroke from the TDC position (crank angle of about 0 degrees) to the BDC position (crank angle of about 180 degrees) to draw air and/or fuel into the respective cylinder 135. Piston 140 may then return to the TDC position (crank angle of about 360 degrees), thereby compressing the air/fuel mixture during the compression stroke. The compressed air/fuel mixture may ignite, causing piston 140 to move back to the BDC position (crank angle of about 540 degrees) during the power stroke. Piston 140 may then return to the TDC position (crank angle of about 720 degrees) to push exhaust gas from cylinder 135 during the exhaust stroke.

One or more cylinder heads 155 may be connected to engine block 130 to form a plurality of combustion chambers 160. As shown in FIG. 1, cylinder heads 155 may include a plurality of intake passages 162 and exhaust passages 163 integrally formed therein. One or more intake valves 165 may be associated with each cylinder 135 and movable to selectively block flow between intake passages 162 and combustion chambers 160. One or more exhaust valves 170 may also be associated with each cylinder 135 and movable to selectively block flow between combustion chambers 160 and exhaust passages 163. Additional engine components may be disposed in cylinder head 155 such as, for example, a plurality of sparkplugs 172 that ignite an air/fuel mixture in combustion chambers 160.

Combustion pressures may vary between different cylinders 135 and between different combustion cycles of a single cylinder 135 during engine operation. Combustion pressures may vary between cylinders 135, for example, because of an uneven distribution of air/fuel mixture delivered to the plurality of cylinders 135 via intake valve 165. Combustion pressures may vary between combustion cycles of the same cylinder 135, for example, because varying amounts of the delivered air/fuel mixture may be combusted in a given combustion cycle, thereby leaving some air/fuel mixture behind within cylinder 135. This residual air/fuel mixture may affect the combustion pressure of a subsequent combustion cycle. For example, variation between combustion cycles may occur because of strong or weak combustion events.

A strong combustion event may occur within a given cylinder 135 when substantially all of the air/fuel mixture trapped within cylinder 135 is fully combusted, resulting in a combustion pressure that may be higher than an average peak cylinder pressure. But, because substantially all of the air/fuel mixture within that cylinder 135 may be combusted during the strong combustion event, the combustion cycle immediately following the strong combustion event may be relatively weak within the same cylinder 135. That is, because there may be less residual air/fuel mixture than in a typical combustion cycle, the cylinder pressure within that cylinder 135 during the subsequent combustion cycle may have a pressure lower than the average peak cylinder pressure, varying significantly from the high combustion pressure of the previous cycle. It is contemplated that there may be combustion events that are stronger than desired, but that do not burn so much air/fuel mixture that the subsequent cycle will be a weak cycle.

A weak combustion event may have an opposite effect, but also cause a significant pressure variation between combustion cycles. Specifically, during a weak combustion event, there may be significant pockets of the air/fuel mixture within cylinder 135 that do not combust, resulting in a combustion pressure that may be lower than an average peak cylinder pressure. Because there may be a significant amount of residual air/fuel mixture within cylinder 135 from the previous cycle, when additional air/fuel mixture is normally admitted for the subsequent cycle, there may be much more of the air/fuel mixture trapped within cylinder 135 than desired. As a result, the combustion pressure during the subsequent combustion cycle may be higher than the average peak cylinder pressure, resulting in a significant pressure variation between combustion cycles.

Detonation (i.e., knock) is an abnormal form of combustion that may be caused by cycle-to-cycle pressure variations. Detonation may cause components of engine 105 to fail such as, for example, a head gasket. Detonation may occur when excessive pressure within cylinder 135 (e.g., during a combustion cycle following a weak combustion event) causes the air/fuel mixture to autoignite. Autoignition may result in multiple pockets of simultaneous combustion within combustion chamber 160 instead of singular combustion. The multiple pockets of combustion can collide with each other with significant force, causing a rapid rise in cylinder pressure and a metallic pinging (i.e., knocking). The detonation forces may subject engine components to overloading, and continued detonation may reduce a service life of engine 105.

Engine 105 may include a plurality of valve actuation assemblies 175 that affect movement of intake valves 165 and/or exhaust valves 170 to help minimize engine knock. Each cylinder 135 may have an associated valve actuation assembly 175. Referring back to FIG. 2, each valve actuation assembly 175 may include a rocker arm 180 connected to move a pair of intake valves 165 via a bridge 182. Rocker arm 180 may be mounted to cylinder head 155 at a pivot point 185, and connected to a rotating camshaft 200 by way of a push rod

190. Camshaft 200 may be operatively driven by crankshaft 145, and may include a plurality of cams 195 that engage and move push rods 190.

Figure 3:
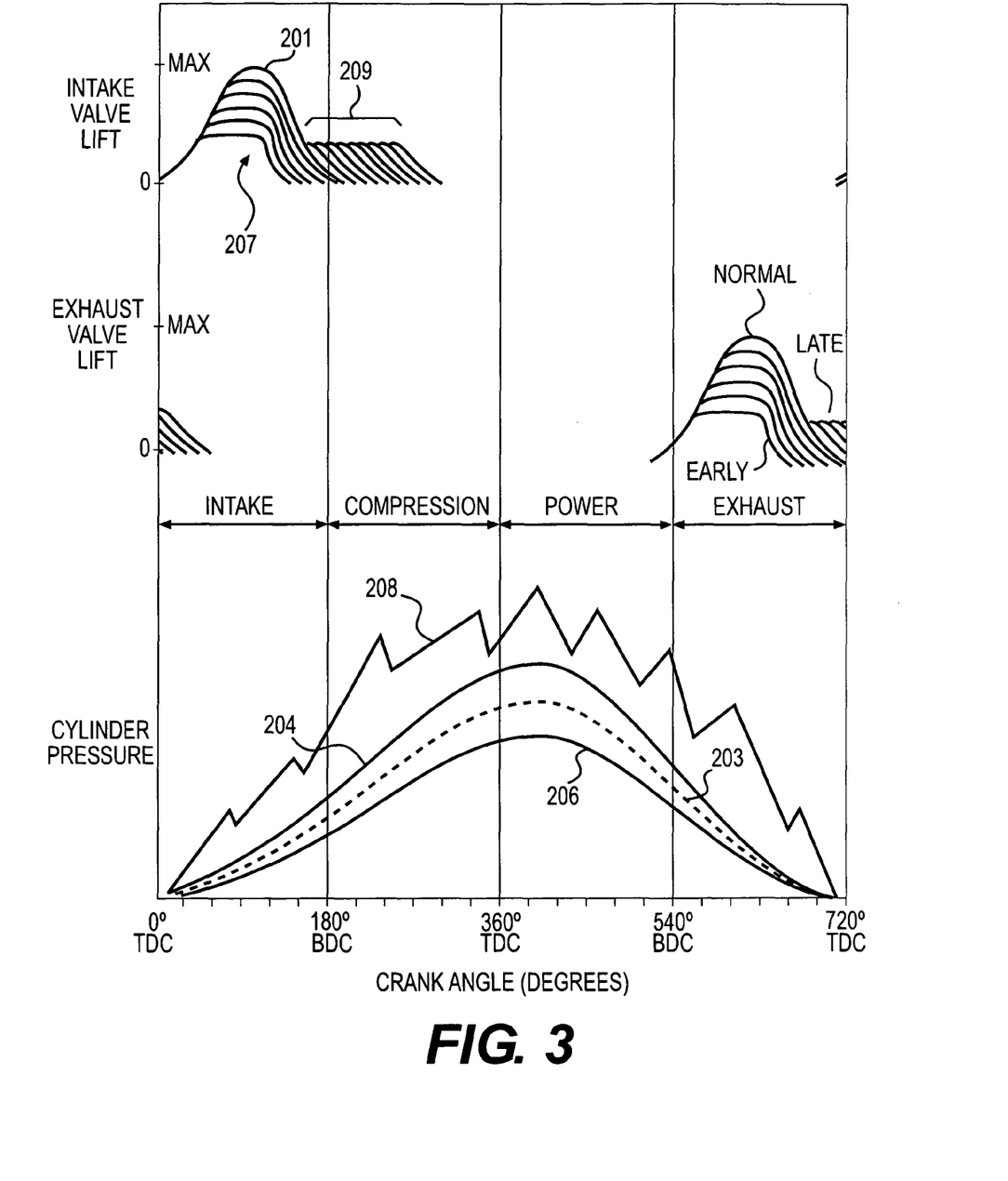
FIG. 3 is an exemplary disclosed graph associated with operation of the engine system of FIG. 2.

As pistons 140 move through the four stokes of the combustion cycle (i.e., intake, compression, power, and exhaust), crankshaft 145 may cyclically drive each valve actuation assembly 175 to move intake valves 165 and/or exhaust valves 170. As shown in FIG. 3, valve actuation assembly 175 may cause intake valve 165 to open during the intake stroke of piston 140. Actuation of intake valves 165 may generally follow profile 201 shown in the upper portion of the graph of FIG. 3. Intake valve 165 may open during the intake stroke, for example, at a crank angle of about 690° to about 0°, and may close at a crank angle of about 210°. Intake valve 165 may displace from a closed position to a maximum open position, during which the air/fuel mixture may be admitted into combustion chamber 160.

A pressure profile of cylinder 135 may substantially match a desired profile 203 during typical combustion events, as shown in the lower portion of the graph of FIG. 3. During a typical combustion event, a pressure within cylinder 135 may reach a peak at a crank angle of between about 360° to about 375° (i.e., at the end of the compression and beginning of a power strokes). Also, during the compression stroke of a typical combustion event, a rate of the pressure rise within cylinder 135 (i.e., a rise-rate of the pressure) may substantially match the slope of desired profile 203 (i.e., when a strong or weak combustion event does not occur). Desired profile 203 illustrates a desired combustion state free from significant detonation, where there is singular combustion of a desired magnitude.

An undesired profile 208, shown in FIG. 3, illustrates a combustion state in which multiple pockets of combustion occur and/or the pressure rise-rate is greater than desired and detonation occurs. The peak cylinder pressure during detonation may be reached earlier than TDC (i.e., during the compression stroke), which is undesirable for maximum efficiency, and have a peak higher than desired. Another undesired profile 206, shown in FIG. 3, illustrates a combustion state in which weak combustion occurs. Weak combustion may occur when a pressure rise-rate within cylinder 135 is less than a desired pressure-rise rate (i.e., less than that of profile 203) and/or a peak thereof is lower than desired. Another profile 204, shown in FIG. 3, illustrates a combustion state in which combustion pressure rise rate and/or magnitudes are slightly higher than desired (i.e., profile 203), but the combustion may not be so strong as to require an adjustment of engine 105. Profiles 203, 204, 206, and 208 are illustrative only, and may vary based on engine operation such as, for example, based on valve timing.

Varying a closing of intake valve 165 may change the pressure profile within cylinder 135 (i.e., a rise-rate and/or a magnitude of the pressure). As shown by a family of curves 207 in FIG. 3, a closing of intake valve 165 may be selectively varied during the intake and/or the compression strokes by any appropriate amount. When intake valve 165 is closed within the family of curves 207, intake valve 165 may be selectively advanced and/or retarded. When intake valve 165 is advanced within the family of curves 207 (i.e., the closing is adjusted to be further away from profile 201), less air/fuel mixture may be trapped within cylinder 135, resulting in a decrease in pressure rise-rate and/or pressure magnitude within cylinder 135. When intake valve 165 is retarded within the family of curves 207 (i.e., the closing is adjusted toward profile 201), more air/fuel mixture may be trapped within cylinder 135, resulting in an increase in pressure rise-rate and/or pressure magnitude within cylinder 135. Intake valve 165 may also be selectively varied during the intake and/or the compression strokes by any appropriate amount within a family of curves 209, shown in FIG. 3. When intake valve 165 is closed within the family of curves 209, the closing may be selectively advanced and/or retarded. When intake valve 165 is retarded within the family of curves 209 (i.e., the closing moves further away from profile 201), less air/fuel mixture may be trapped within cylinder 135, resulting in a decrease in pressure rise-rate and/or pressure magnitude within cylinder 135. When intake valve 165 is advanced within the family of curves 209 (i.e., the closing moves toward profile 201), more air/fuel mixture may be trapped within cylinder 135, resulting in an increase in pressure rise-rate and/or pressure magnitude within cylinder 135. Intake valve 165 may be varied by an amount that substantially correlates to a comparison of an actual or anticipated pressure profile with the desired profile 203. Intake valve 165 may be varied by a greater or lesser amount, as required, to regulate the fluid flow to cylinder 135 and thereby bring the combustion profile within cylinder 135 toward the desired profile 203.

For example, weak combustion (e.g., profile 206) may be detected within cylinder 135. During a cycle following weak combustion, the closing of intake valve 165 may be advanced within the family of curves 207 or retarded within the family of curves 209 to decrease the magnitude and pressure rise-rate within cylinder 135 toward desired profile 203. The closing of intake valve 165 may thereby be moved away from a profile of intake valve 165 having a timing that has not been varied (i.e., away from unadjusted profile 201) when the pressure within cylinder 135 is higher than a desired pressure. In contrast, during a combustion cycle following strong combustion (e.g., profile 204), the closing of intake valve 165 may be retarded within the family of curves 207 or advanced within the family of curves 209 to increase the magnitude and pressure rise-rate within cylinder 135 toward desired profile 203. The closing of intake valve 165 may thereby be moved toward a profile of intake valve 165 having a timing that has not been varied (i.e., toward unadjusted profile 201) when the pressure within cylinder 135 is lower than a desired pressure.

It is also contemplated that when profile 204 is detected within cylinder 135 (i.e., the magnitude and/or pressure rise-rate are slightly higher than desired), a closing of intake valves 165 may not require adjustment. An adjustment to engine 105 may not be required when enough air/fuel mixture remains within cylinder 135 such that a weak combustion cycle does not follow a combustion cycle having profile 204.

The timing of intake valve 165 may be adjusted based on detonation detection, a strong combustion detection, and/or a weak combustion detection (i.e., based on a measured rise-rate, a number of combustion pressure peaks, and/or an angular location of the peak). As shown in profile 208 of FIG. 3, detonation caused by autoignition may cause a slope of the pressure rise-rate in cylinder 135 to increase sharply, and the peak cylinder pressure may be reached before TDC of the compression stroke. Similarly, detonation caused by multiple combustion pockets may be observed as a plurality of sharp rises and/or drops in the pressure rise-rate. In profile 208, the pressure rise rate may sharply increase and/or decrease in an irregular pattern. The closing of intake valve 165 may be adjusted to reduce the likelihood and/or magnitude of detonation, and to create a balance between strong and weak combustion events.

It is contemplated that an opening of exhaust valve 170 may also or alternatively be advanced or retarded by variable valve actuation device 202. As illustrated in FIG. 3, an opening of exhaust valve 170 may be selectively advanced or additionally opened during portions of the compression and/ or power strokes. Because more air/fuel mixture may escape from cylinder 135 during the compression and/or power strokes when the opening of exhaust valve 170 is advanced, the amount of trapped mass within cylinder 135 may decrease, thereby decreasing a combustion pressure, a riserate, and/or shifting the angular location of peaks within cylinder 135. The opening of exhaust valve 170 may also be selectively retarded during portions of the compression and/or power strokes. Because less air/fuel mixture may escape from cylinder 135 when the opening of exhaust valve 170 is retarded, the amount of trapped mass within cylinder 135 may increase, thereby increasing a combustion pressure, a riserate, and/or shifting the angular location of peaks within cylinder 135.

Variable valve actuation system 110 may include a plurality of variable valve actuation devices 202 configured to adjust timings of intake valves 165 and/or exhaust valves 170 to reduce effects of detonation, strong combustion events, and/or weak combustion events. As shown in FIGS. 1 and 2, variable valve actuation device 202 may be attached to and/or enclosed by a valve housing 205 of engine 105. Each cylinder 135 may have an associated variable valve actuation device 202. Variable valve actuation device 202 may selectively adjust an opening timing, closing timing, and/or lift magnitude of intake valves 165 and/or exhaust valves 170. Variable valve actuation device 202 may be any suitable device for varying a valve timing such as, for example, a hydraulic, pneumatic, or mechanical device.

In one example, variable valve actuation device 202 may be operatively connected to rocker arm 180, intake valve 165, and/or exhaust valve 170 to selectively disconnect a movement of intake and/or exhaust valves 165, 170 from a movement of rocker arm 180. For example, variable valve actuation device 202 may be selectively operated to supply hydraulic fluid, for example, at a low or a high pressure, in a manner to resist closing of intake valve 165. That is, after valve actuation assembly 175 is no longer holding intake valve 165 and/or exhaust valve 170 open, the hydraulic fluid in variable valve actuation device 202 may hold intake valve 165 and/or exhaust valve 170 open for a desired period. Similarly, the hydraulic fluid may be used to advance a closing of intake valve 165 and/or exhaust valve 170 so that intake valve 165 and/or exhaust valve 170 closes earlier than the timing affected by valve actuation assembly 175. Alternatively, intake and/or exhaust valves 165, 170 may be moved solely by variable valve actuation device 202 without the use of cams and/or rocker arms, if desired.

Variable valve actuation device 202 may selectively advance or retard a closing of intake and/or exhaust valves 165, 170 during the different strokes of engine 105. Intake valve 165 may be closed early, for example, at a crank angle of between about 180° and about 210°. Control system 125 may also control variable valve actuation device 202 to retard a closing of intake valve 165. Intake valve 165 may be closed, for example, at a crank angle of between about 210° and about 300°. Exhaust valve 170 may be varied to open at a crank angle of between about 510° and about 570° and may be varied to close at a crank angle of between about 700° and about 60°. Exhaust valve 170 may also be opened at a crank angle of about 330° and closed at a crank angle of about 390°. Control system 125 may control each variable valve actuation device 202 to vary the valve timing of each cylinder 135 independently of the valve timing of the other cylinders 135. Control system 125 may thereby independently control a throttling of each cylinder 135 solely by varying a timing of intake valves 165 and/or exhaust valves 170.

Referring back to FIG. 2, intake system 115 may direct air and/or fuel into combustion chambers 160, and may include a single fuel injector 210, a compressor 215, and an intake manifold 220. Compressor 215 may compress and deliver an air/fuel mixture from fuel injector 210 to intake manifold 220.

Compressor 215 may draw ambient air into intake system 115 via a conduit 225, compress the air, and deliver the compressed air to intake manifold 220 via a conduit 230. This delivery of compressed air may help to overcome a natural limitation of combustion engines by eliminating an area of low pressure within cylinders 135 created by a downward stroke of pistons 140. Therefore, compressor 215 may increase the volumetric efficiency within cylinders 135, allowing more air/fuel mixture to be burned, resulting in a larger power output from engine 105. It is contemplated that a cooler for further increasing the density of the air/fuel mixture may be associated with compressor 215, if desired.

Fuel injector 210 may inject fuel at a low pressure into conduit 225, upstream of compressor 215, to form an air/fuel mixture. Fuel injector 210 may be selectively controlled by control system 125 to inject an amount of fuel into intake system 115 to substantially achieve a desired air-to-fuel ratio of the air/fuel mixture. Variable valve actuation device 202 may vary a timing of intake valves 165 and/or exhaust valves 170 to control an amount of air/fuel mixture that is delivered to cylinders 135.

Exhaust system 120 may direct exhaust gases from engine 105 to the atmosphere. Exhaust system 120 may include a turbine 235 connected to exhaust passages 163 of cylinder head 155 via a conduit 245. Exhaust gas flowing through turbine 235 may cause turbine 235 to rotate. Turbine 235 may then transfer this mechanical energy to drive compressor 215, where compressor 215 and turbine 235 form a turbocharger 250. In one embodiment, turbine 235 may include a variable geometry arrangement 255 such as, for example, variable position vanes or a movable nozzle ring. Variable geometry arrangement 255 may be adjusted to affect the pressure of air/fuel mixture delivered by compressor 215 to intake manifold 220. Turbine 235 may be connected to an exhaust outlet via a conduit 260. It is also contemplated that turbocharger 250 may be replaced by any other suitable forced induction system known in the art such as, for example, a supercharger, if desired.

Control system 125 may include a controller 270 configured to control the function of the various components of engine system 100 in response to input from one or more sensors 272. Sensors 272 may be configured to monitor an engine parameter indicative of an amount of air/fuel mixture within cylinders 135 (i.e., robustness, pressure, and/or temperature of a combustion event). Each sensor 272 may be disposed within an associated cylinder 135 (i.e., in fluid contact with a respective one of combustion chambers 160), and may be electrically connected to controller 270. Sensor 272 may be any suitable sensing device for sensing an amount of air/fuel mixture such as, for example, a piezoelectric crystal sensor or a piezoresistive pressure sensor. In one embodiment, sensors 272 may measure the amount of air/fuel mixture within cylinders 135 during, for example, the compression stroke and/or the power stroke, and may generate a corresponding signal. Sensors 272 may transfer signals that are indicative of the air/fuel mixture amount within cylinders 135 to controller 270. In another embodiment, sensors 272 may measure a peak cylinder pressure within cylinder 135 during, for example, the compression stroke and/or the power stroke, and transfer a corresponding signal to controller 270.

Based on the signals, controller 270 may determine an air/fuel mixture profile for each cylinder 135. The air/fuel mixture profile may be a measurement of how the amount of air/fuel mixture within cylinder 135 changes during a combustion cycle and from cycle to cycle. The air/fuel mixture profile may be a continuous indication of an amount of air/fuel mixture within each cylinder 135 and may be used to predict, for example, whether strong, weak, or normal combustion will occur in a subsequent combustion event. Controller 270 may monitor the signals over time to determine a pressure rise-rate within cylinder 135, a number of pressure peaks during a single cycle, a magnitude of the peaks, and/or an angular location of the peaks. Controller 270 may then relate this information to the amount of the air/fuel mixture in cylinder 135 at any given time.

Controller 270 may then compare the amount of air/fuel mixture to a desired amount. In one example, the amount may be an amount that is predetermined such that normal combustion may be maintained within cylinder 135. The amount of one cylinder 135 may be compared with the amount of other cylinders 135 of engine 105. In another example, the desired amount may be a fixed base amount that may correspond to a given engine rating. In one embodiment, the desired amount may be stored within a map of controller 270. Based on a comparison of the monitored amount with the desired amount, controller 270 may make adjustments to the timings of valves 165, 170. Controller 270 may also compare the sensed peak cylinder pressure within cylinder 135 to a desired peak cylinder pressure that may be a fixed base amount that may correspond to a given engine rating or that may be based on a load of engine 105 as measured by sensors 272. The desired peak cylinder pressure may be stored within a map of controller 270. Based on a comparison of the sensed peak cylinder pressure with the desired peak cylinder pressure, controller 270 may make an associated timing adjustment to valves 165, 170. Controller 270 may equate the sensed peak cylinder pressure to the amount of air/fuel mixture remaining within cylinder 135 based on signals received from sensors 272.

For example, controller 270 may compare the amount of the air/fuel mixture of one cylinder 135 to amounts corresponding to pressure profile 203. If the monitored amount will result in a pressure rise-rate, peak, and/or angular location that substantially matches that of profile 203, then controller 270 may determine that cylinder 135 has or will have a desired amount for the subsequent combustion cycle. If the amount corresponds to a pressure rise-rate, peak, and/or angular location that does not substantially match that of profile 203, then controller 270 may determine that cylinder 135 has or will have an amount that could correspond to weak combustion, strong combustion, and/or detonation.

Based on the combustion strength determination (i.e., the determination of the amount of the air/fuel mixture remaining in cylinder 135), controller 270 may make an appropriate adjustment to engine 105. Specifically, controller 270 may control variable valve actuation device 202 to selectively advance and/or retard intake and/or exhaust valves 165, 170 of cylinders 135. For example, controller 270 may retard intake valves 165 within the family of curves 207 or advance intake valves 165 within the family of curves 209 when a residual amount of air/fuel mixture remaining in cylinder 135 from a previous combustion cycle is less than a desired residual amount corresponding to typical combustion. Controller 270 may advance intake valves 165 within the family of curves 207 or retard intake valves 165 within the family of curves 209 when a residual amount of air/fuel mixture remaining in cylinder 135 from a previous combustion cycle is greater than a desired residual amount corresponding to typical combustion. Controller 270 may selectively advance and/or retard intake valves 165 during, for example, an intake stroke. Controller 270 may selectively advance and/or retard intake valves 165 based on, for example, sensor input measured during a stroke of a subsequent engine cycle or sensor input measured during the same stroke as the advancing and/or retarding.

It is also contemplated that controller 270 may selectively advance and/or retard exhaust valves 170 based on combustion strength determination (i.e., the determination of the amount of the air/fuel mixture remaining in cylinder 135). For example, controller 270 may advance an opening of exhaust valves 170 when a residual amount of air/fuel mixture remaining in cylinder 135 from a previous combustion cycle is greater than a desired residual amount corresponding to typical combustion. Controller 270 may retard an opening of exhaust valves 170 when a residual amount of air/fuel mixture remaining in cylinder 135 from a previous combustion cycle is less than a desired residual amount corresponding to typical combustion.

Controller 270 may be any type of programmable logic controller known in the art for automating machine processes, such as a switch, a process logic controller, or a digital circuit. Controller 270 may serve to control the various components of engine system 100. Controller 270 may be electrically connected to the plurality of variable valve actuation devices 202 via a plurality of electrical lines 275. Controller 270 may also be electrically connected to the plurality of sensors 272 via a plurality of electrical lines 280. Controller 270 may be electrically connected to variable geometry arrangement 255 via an electrical line 285. It is also contemplated that controller 270 may be electrically connected to additional components and sensors of engine system 100 such as, for example, an actuator of fuel injector 210, if desired.

Controller 270 may include input arrangements that allow it to monitor signals from the various components of engine system 100 such as sensors 272. Controller 270 may rely upon digital or analog processing of input received from components of engine system 100 such as, for example, sensors 272 and an operator interface. Controller 270 may utilize the input to create output for controlling engine system 100. Controller 270 may include output arrangements that allow it to send output commands to the various components of engine system 100 such as variable valve actuation devices 202, variable geometry arrangement 255, fuel injector 210, and/or an operator interface.

Controller 270 may have stored in memory one or more engine maps and/or algorithms. Controller 270 may include one or more maps stored within an internal memory, and may reference these maps to determine a required change in engine operation, a modification of an engine parameter required to affect the required change in engine operation, and/or a capacity of engine 105 for the modification. Each of these maps may include a collection of data in the form of tables, graphs, and/or equations.

Controller 270 may have stored in memory algorithms associated with determining required changes in engine operation based on engine parameters such as, for example, an amount of residual air/fuel mixture from cycle-to-cycle. Based on input received from sensors 272, the algorithm may determine an average air/fuel mixture amount per cylinder per combustion cycle. The algorithm may then determine the statistical deviation of the air/fuel mixture amount of each cylinder 135 from the average air/fuel mixture amount. Using the statistical deviation, the algorithm may identify which cylinder air/fuel mixture amounts are required to be increased or decreased to reduce the variation of air/fuel mixture amounts. The algorithm may perform a similar statistical analysis of air/fuel mixture amounts between combustion cycles (i.e., as a function of time), to identify which cylinders 135 have air/fuel mixture amounts that should be increased or decreased in subsequent combustion cycles.

INDUSTRIAL APPLICABILITY

The disclosed method for varying combustion pressure of an engine cylinder may be used in any machine having a combustion engine. For example, the method may be used in highly-loaded pre-mix charge engines such as gaseous-fuel driven engines utilized in electrical power generation applications.

During normal combustion events, piston 140 may move through the four strokes of the combustion cycle. The movement of piston 140 drives the actuation of intake valve 165 and exhaust valve 170 via valve actuation assembly 175. Profile 203, shown in the lower portion of FIG. 3, may occur during normal combustion within cylinder 135.

A weak combustion event may occur within cylinder 135. In the weak combustion event, less air/fuel mixture than desired may be combusted in cylinder 135. Weak combustion pressure profile 206, shown in the lower portion of FIG. 3, may result. Controller 270 compares the measured pressure profile 206 within cylinder 135 to the desired combustion profile 203 to determine a difference between an amount of residual air/fuel mixture that may remain within cylinder 135 during the subsequent combustion cycle and a desired amount. More residual air/fuel mixture may remain within cylinder 135 than desired during the combustion cycle following the weak combustion event.

During the cycle following the weak combustion event, the closing of intake valve 165 may be advanced within the family of curves 207 or retarded within the family of curves 209 to decrease the magnitude and pressure rise-rate within cylinder 135 (i.e., adjusted away from a profile 201 of intake valve 165 having a timing that has not been varied). Controller 207 may thereby decrease the amount of air/fuel mixture within cylinder 135. The amount of retarding may be based on the amount of residual air/fuel mixture that was determined by controller 270. Controller 270 may thereby substantially reduce strong combustion and/or detonation (i.e., profiles 204, 208) during the subsequent cycle and substantially maintain combustion profile 203 within cylinder 135. Engine detonation may thereby be substantially reduced. Sensors 272 continue to measure parameters indicative of the amount of air/fuel mixture within cylinder 135 and provide corresponding input to controller 270.

A strong combustion event may occur within cylinders 135. In the strong combustion event, more air/fuel mixture than desired may be combusted in cylinder 135. Strong combustion pressure profile 204, shown in the lower portion of FIG. 3, may result. Controller 270 compares the measured pressure profile 204 within cylinder 135 to the desired combustion profile 203 to determine a difference between an amount of residual air/fuel mixture that may remain within cylinder 135 during the subsequent combustion cycle and a desired amount. Less residual air/fuel mixture may remain within cylinder 135 than desired during the combustion cycle following the strong combustion event.

During the cycle following the strong combustion event, the closing of intake valve 165 may be retarded within the family of curves 207 or advanced within the family of curves 209 to increase the magnitude and pressure rise-rate within cylinder 135 (i.e., adjusted toward a profile 201 of intake valve 165 having a timing that has not been varied). The amount of advancing may be based on the amount of residual air/fuel mixture that was determined by controller 270. Controller 270 may thereby substantially reduce weak combustion (i.e., profile 206) during the subsequent cycle and substantially maintain combustion profile 203 within cylinder 135. Sensors 272 continue to measure parameters indicative of the amount air/fuel mixture within cylinder 135 and provide corresponding input to controller 270.

When a combustion event that is slightly greater than a desired combustion event occurs, an adjustment of the timing of intake valves 165 may not be required. For example, when combustion profile 204 is detected, controller 270 may determine that the amount of air/fuel mixture remaining during the subsequent combustion cycle will not be low enough to cause an undesired pressure variation during the subsequent combustion cycle (i.e., weak combustion). Therefore, controller 270 may make no adjustment when profile 204 is detected. However, if profile 204 exceeds a threshold such as, for example, an engine map threshold, then an adjustment of intake valves 165 may be made that is similar to the adjustment described above for a cycle following strong combustion.

By adjusting the valve timing of each cylinder 135 based on air/fuel mixture amounts measured during previous combustion cycles, engine system 100 may reduce pressure variation within cylinder 135 between combustion cycles, thereby balancing the load of engine 105 between combustion cycles. The combustion profiles within cylinder 135 may be maintained at a desired profile, providing a substantially balanced and constant output from engine 105 that may be beneficial for some power generation applications. Also, engine 105 may be operated closer to its load limit because less margin of error may be required to protect engine components from significantly higher cylinder pressures caused by air/fuel mixture variations between combustion cycles. Additionally, by reducing air/fuel mixture variation between combustion cycles, detonation may be reduced in engine 105.

It will be apparent to those skilled in the art that various modifications and variations can be made to the disclosed method and apparatus. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A control system for an engine having a cylinder, the control system comprising:
   an engine valve movable to regulate a fluid flow of the cylinder;
   an actuator associated with the engine valve;
   a pressure sensor configured to sense a peak cylinder pressure; and
   a controller in communication with the actuator and the sensor, the controller being configured to:
   equate the sensed peak cylinder pressure to an amount of an air/fuel mixture remaining within the cylinder;
   compare the amount with a desired amount; and
   selectively regulate the actuator to adjust a timing of the engine valve associated with a subsequent combustion event based on the comparison.

2. The control system of claim 1, wherein the pressure sensor is configured to sense the peak cylinder pressure during a power stroke of the engine.

3. The control system of claim 1, wherein the controller is configured to compare the sensed peak cylinder pressure with a desired peak cylinder pressure to determine an associated amount of timing adjustment.

4. The control system of claim 3, wherein the desired peak cylinder pressure is based on a rating of the engine.

5. The control system of claim 4, wherein the desired peak cylinder pressure is also based on a load of the engine.

6. The control system of claim 1, wherein the engine valve is an intake valve, and the controller is configured to selectively regulate the actuator to adjust a closing timing of the intake valve.

7. The control system of claim 6, wherein the controller is configured to adjust the intake valve closing away from an unadjusted profile when the amount is substantially greater than the desired amount.

8. The control system of claim 6, wherein the controller is configured to adjust the intake valve closing toward an unadjusted profile when the amount is substantially less than the desired amount.

9. The control system of claim 1, wherein the subsequent combustion event occurs during an engine cycle immediately following an engine cycle during which the first combustion event occurs.

10. A method of operating an engine, comprising:
sensing with a pressure sensor a peak cylinder pressure during a power stroke of an engine associated with a generator;
equating the sensed peak cylinder pressure to an amount of an air/fuel mixture remaining within the cylinder;
comparing the amount with a desired amount; and
selectively adjusting a valve timing of the engine associated with a subsequent combustion event based on the comparison.

11. The method of claim 10, wherein comparing the amount with the desired amount includes comparing the sensed peak cylinder pressure with a desired peak cylinder pressure, and the method further includes responsively determining an associated amount of timing adjustment.

12. The method of claim 11, wherein the desired peak cylinder pressure is based on at least one of a rating of the engine and a load of the engine.

13. The method of claim 10, wherein the selectively adjusting the valve timing includes selectively adjusting an intake closing timing.

14. The method of claim 13, wherein selectively adjusting the intake closing timing includes adjusting a valve closing away from an unadjusted profile when the amount is substantially greater than the desired amount.

15. The method of claim 14, wherein selectively adjusting includes adjusting a valve closing toward an unadjusted profile when the amount is substantially less than the desired amount.

16. The method of claim 10, wherein the subsequent combustion event occurs during an engine cycle immediately following an engine cycle during which the first combustion event occurs.

17. A genset, comprising:
a generator configured to generate an electrical output;
an engine having:
a cylinder;
an engine valve movable to regulate a fluid flow of the cylinder;
an actuator associated with the engine valve;
a crankshaft driven by combustion within the cylinder to mechanically rotate the generator;
a pressure sensor configured to sense a peak cylinder pressure; and
a controller in communication with the actuator and the sensor, the controller being configured to:
equate the sensed peak cylinder pressure to an amount of an air/fuel mixture remaining within the cylinder;
compare the amount with a desired amount; and
selectively regulate the actuator to adjust a timing of the engine valve associated with a subsequent combustion event based on the comparison.

18. The genset of claim 17, wherein the engine valve is an intake valve, and the controller is configured to selectively regulate the actuator to adjust a closing timing of the intake valve.

19. The genset of claim 18, wherein the controller is configured to adjust the intake valve closing away from an unadjusted profile when the amount is substantially greater than the desired amount.

20. The genset of claim 18, wherein the controller is configured to adjust the intake valve closing toward an unadjusted profile when the amount is substantially less than the desired amount.

* * * * *